United States Patent
Sprague et al.

(10) Patent No.: US 8,819,911 B2
(45) Date of Patent: *Sep. 2, 2014

(54) METHOD AND APPARATUS FOR JET PUMP RESTRAINER ASSEMBLY REPAIR

(75) Inventors: Robin D. Sprague, Wilmington, NC (US); Michael S. Defilippis, Wilmington, NC (US); Mark O. Lenz, San Jose, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 862 days.

This patent is subject to a terminal disclaimer.

(21) Appl. No.: 12/385,041

(22) Filed: Mar. 30, 2009

(65) Prior Publication Data

US 2010/0242279 A1   Sep. 30, 2010

(51) Int. Cl.
*B23Q 7/04* (2006.01)
(52) U.S. Cl.
USPC ......... 29/283; 29/888.021; 376/302; 417/360
(58) Field of Classification Search
USPC .................. 29/283, 888.021; 105/198.4, 404; 376/247, 260, 372; 417/360
See application file for complete search history.

(56) References Cited

U.S. PATENT DOCUMENTS

| | | | | |
|---|---|---|---|---|
| 4,675,149 A | * | 6/1987 | Perry et al. | 376/260 |
| 5,978,433 A | * | 11/1999 | Erbes et al. | 376/372 |
| 6,052,425 A | * | 4/2000 | Erbes et al. | 376/260 |
| 6,320,923 B2 | * | 11/2001 | Wivagg et al. | 376/407 |
| 6,435,839 B1 | * | 8/2002 | Erbes | 417/63 |
| 7,023,949 B2 | | 4/2006 | Wivagg | |
| 2004/0190671 A1 | | 9/2004 | Wivagg | |
| 2007/0189434 A1 | | 8/2007 | Jensen | |
| 2011/0135049 A1 | * | 6/2011 | Wroblewski et al. | 376/372 |

FOREIGN PATENT DOCUMENTS

| | | |
|---|---|---|
| JP | 2003161795 A | 6/2003 |
| JP | 2007-333431 | 12/2007 |

OTHER PUBLICATIONS

European Search Report dated Oct. 24, 2013 for European Application No. 10156868.1.
Unofficial English translation of a JP Office Action dated Mar. 4, 2014 issued in connection with corresponding JP Patent Application No. 2010-071277.

* cited by examiner

*Primary Examiner* — Alexander P Taousakis
(74) *Attorney, Agent, or Firm* — Harness, Dickey & Pierce, PLC

(57) ABSTRACT

A method and apparatus for repairing and/or preventatively maintaining a jet pump restrainer assembly used in a Boiling Water Reactor (BWR), the repair including attaching a bearing plate or plates to a horizontal surface of a jet pump restrainer assembly bracket, the bearing plate or plates acting to supplement and/or replace an existing contact surface between a mixer wedge and the jet pump restrainer assembly bracket of a jet pump restrainer assembly.

26 Claims, 11 Drawing Sheets

METHOD AND APPARATUS FOR JET PUMP RESTRAINER ASSEMBLY REPAIR

BACKGROUND OF THE INVENTION

1. Field of the Invention

Example embodiments relate in general to a method and apparatus for the mechanical repair of a Boiling Water Reactor (BWR) jet pump restrainer assembly. Specifically, example embodiments relate to mechanical repair of a potentially damaged contact area on either an inlet mixer wedge or a restrainer bracket of a restrainer assembly used to horizontally support a jet pump assembly against riser piping to reduce vibration.

2. Related Art

BWRs are designed to generate steam in reactor pressure vessels ("RPVs") by heating the water surrounding uranium-containing tubes of fuel assemblies located in the RPV core regions. The RPVs have recirculation loops designed to facilitate the circulation of water in the core regions. The recirculation loops generally include large centrifugal pumps that pump water out of the RPVs and return the water to the inlets of jet pump assemblies located in annular regions in the RPVs surrounding the core regions. The jet pump assemblies are designed to entrain the surrounding water in the annular regions and then discharge the water in a manner that induces a desired flow pattern in the core regions.

The jet pump assemblies are subject to vibrations caused by hydraulic forces due to the flow of water and/or by the rotation of the centrifugal pumps. Thus, in one BWR design, the jet pump assemblies are horizontally supported against vibration with a jet pump restrainer assembly including a bracket using a three point suspension system. A three point system generally includes a wedge movably mounted on a vertically oriented guide rod that is attached to a jet pump assembly and extends through the space between the bracket and the jet pump. The wedge, which may weigh about seven pounds, is designed to slide downwardly under the force of gravity into the space between the bracket and the jet pump assembly and thereby urge the jet pump against the adjustment screws.

It has been found that the mating (or seating) surfaces of the wedges and/or the brackets of some commercial BWRs have worn substantially after operation over long periods of time. In some cases, the softer interior metal underlying the hardened surfaces of the wedges have worn extensively. It is believed that the wearing is caused by a fretting type of action when the hydraulic forces and/or pump vibrations induce the wedges to chatter or to rise upwardly and then fall back against the bracket. In addition, it is believed that the jet pump assemblies may move away from the adjustment screws in extreme cases.

The jet pump restrainer assemblies may be repaired by replacing the worn wedges and/or brackets. However, the jet pump assemblies and/or brackets would need to be disassembled, machined and reassembled, and the old parts would need to be replaced.

SUMMARY OF INVENTION

Example embodiments provide a method of repairing the BWR jet pump restrainer assemblies without requiring the disassembly of the jet pump assemblies and/or the associated brackets. Example embodiments may also allow for the continued use of the worn wedges and/or brackets.

Example embodiments include a method of repairing a BWR jet pump restrainer assembly, in situ. The jet pump assembly extends vertically through a hole in a bracket attached to a riser pipe and is supported against horizontal movement by a plurality of screws extending from the bracket toward the jet pump assembly by a wedge extending into the hole. The wedge is moveably mounted on a vertically extending guide rod fastened to the jet pump assembly. The wedge has a vertically extending inner surface designed to contact the jet pump assembly and an outer surface inclined relative to the vertically extending inner surface designed to contact the bracket. The mating surfaces of the wedge and bracket are the surfaces that are susceptible to wear over time. Example embodiments provide for the placement of bearing plates above and/or below the bracket to provide an additional bearing surface or surfaces between the inlet mixer wedge and the bracket. Example embodiments allow for a bearing plate or plates to assist in supplementing, or in essence expanding the existing contact surface between the inlet mixer wedge and the restrainer bracket. Alternatively, example embodiments allow the existing inlet mixer wedge to be repositioned (the wedge may be partially withdrawn), allowing the bearing plate or plates to be shifted toward the wedge such that a new contact surface between the bearing plates and the wedge replaces the contact surface between the wedge and the existing bracket (i.e., following repair, the wedge and bracket no longer directly contacts each other). Additionally, example embodiments allow for a replacement and/or machining of either the wedge or the bracket, or both, in addition to the placement of a bearing plate or plates to provide additional support. Example embodiments also allow for a replacement wedge that is either smaller (i.e., narrower), larger (i.e., wider), or the same size as the original wedge, or a replacement wedge with a smaller or larger angle of inclination as the original wedge, thereby allowing the wedge to contact the bearing plate or plates while not necessarily contacting the bracket directly.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
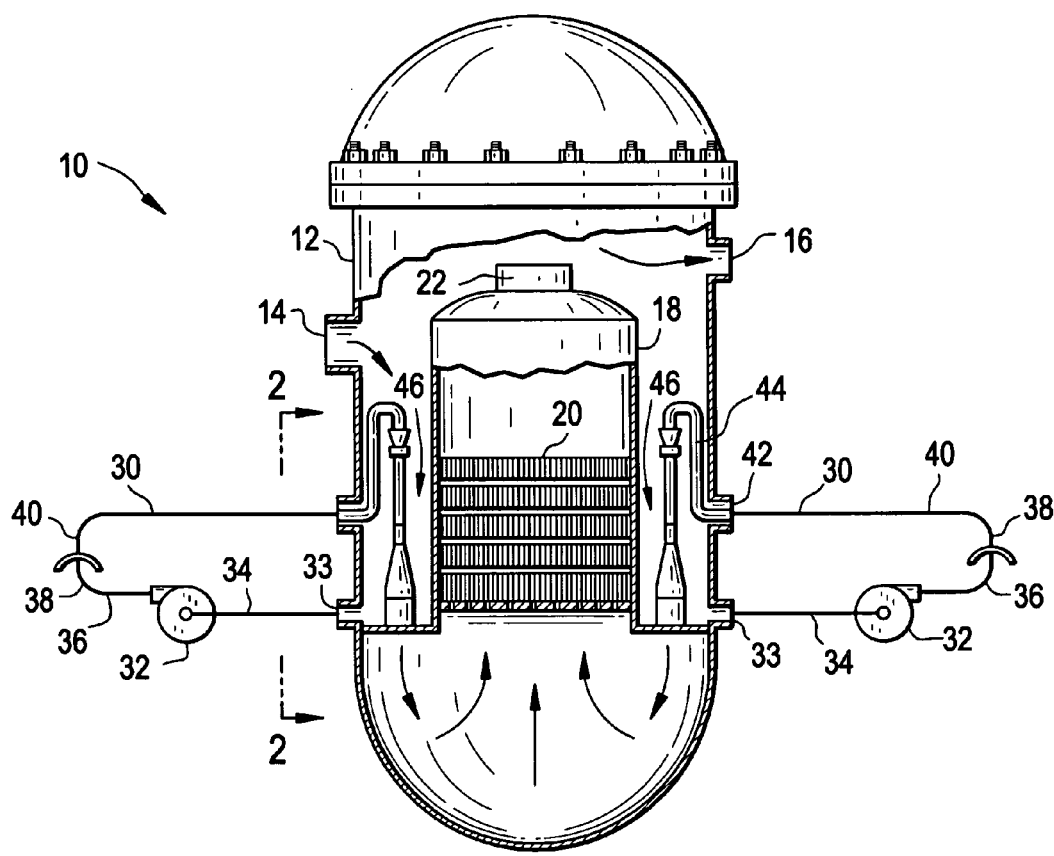
FIG. 1 is schematic representation of a conventional BWR characterized by a reactor pressure vessel ("RPV") having two recirculation loops.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Referring to FIG. 1, the drawing is a schematic representation illustrating a commercial boiling water nuclear reactor ("BWR") 10 that generates steam in a reactor pressure vessel ("RPV") 12. Commercial BWRs are designed to drive turbines (not shown), which in turn generates electrical power. The RPV 12 has a main feedwater inlet nozzle 14 for receiving condensate from a condenser (not shown) and a main steam outlet nozzle 16 for providing generated steam to a turbine. The RPV 12 supports a core shroud 18 containing a plurality of fuel assemblies 20 that generate the steam in its core region and a steam separator/dryer assembly 22 located over the core shroud 18.

The RPV 12 illustrated by FIG. 1 has two recirculation loops 30 for facilitating the flow of water in its core region. Each recirculation loop 30 has a large centrifugal reactor coolant pump ("RCP") 32 connected with a recirculation water outlet nozzle 33 of the RPV 12 by pump suction piping 34 for pumping water out of the RPV 12 and pump discharge piping 36 for pumping the water back into the RPV 12. The pump discharge piping 36 generally includes a header 38 and parallel branch piping, which is illustrated by piping 40. Each of the piping branches 40 is connected by a recirculation water inlet nozzle 42 to riser piping 44, which extends to a pair of jet pump assemblies 46 operating in parallel (only one of which is illustrated by FIG. 1).

Figure 2:
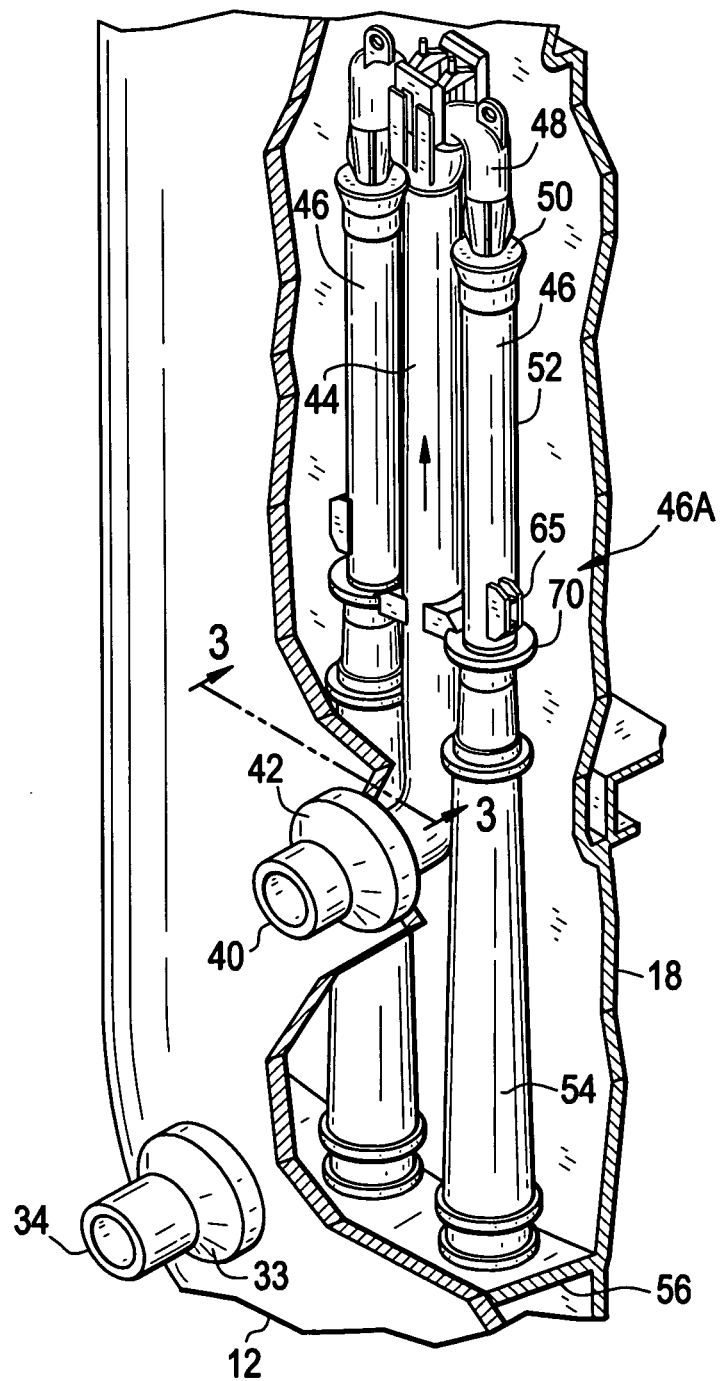
FIG. 2 is a partial perspective schematic representation of a RPV taken along Line 2-2 of FIG. 1, which depicts a cut-away showing a conventional jet pump assembly arrangement.

As is best seen in FIG. 2, the riser piping 44 terminates at a manifold 48 sometimes referred to as a "ramshead". Each jet pump assembly 46 of the pair generally includes an inlet 50 adjacent the manifold 48 that is open to an annular region defined by the wall of the RPV 12 and wall of the core shroud 18 for entraining the surrounding water in the annular region, a mixing section 52 and a diffuser section 54 supported on a crossplate 56. A jet pump restrainer assembly 46A is used to horizontally restrain jet pump assembly 46 to riser pipe 44. The jet pump assembly 46 may have a boss 49 on its periphery surface as shown in FIG. 3.

Figure 3:
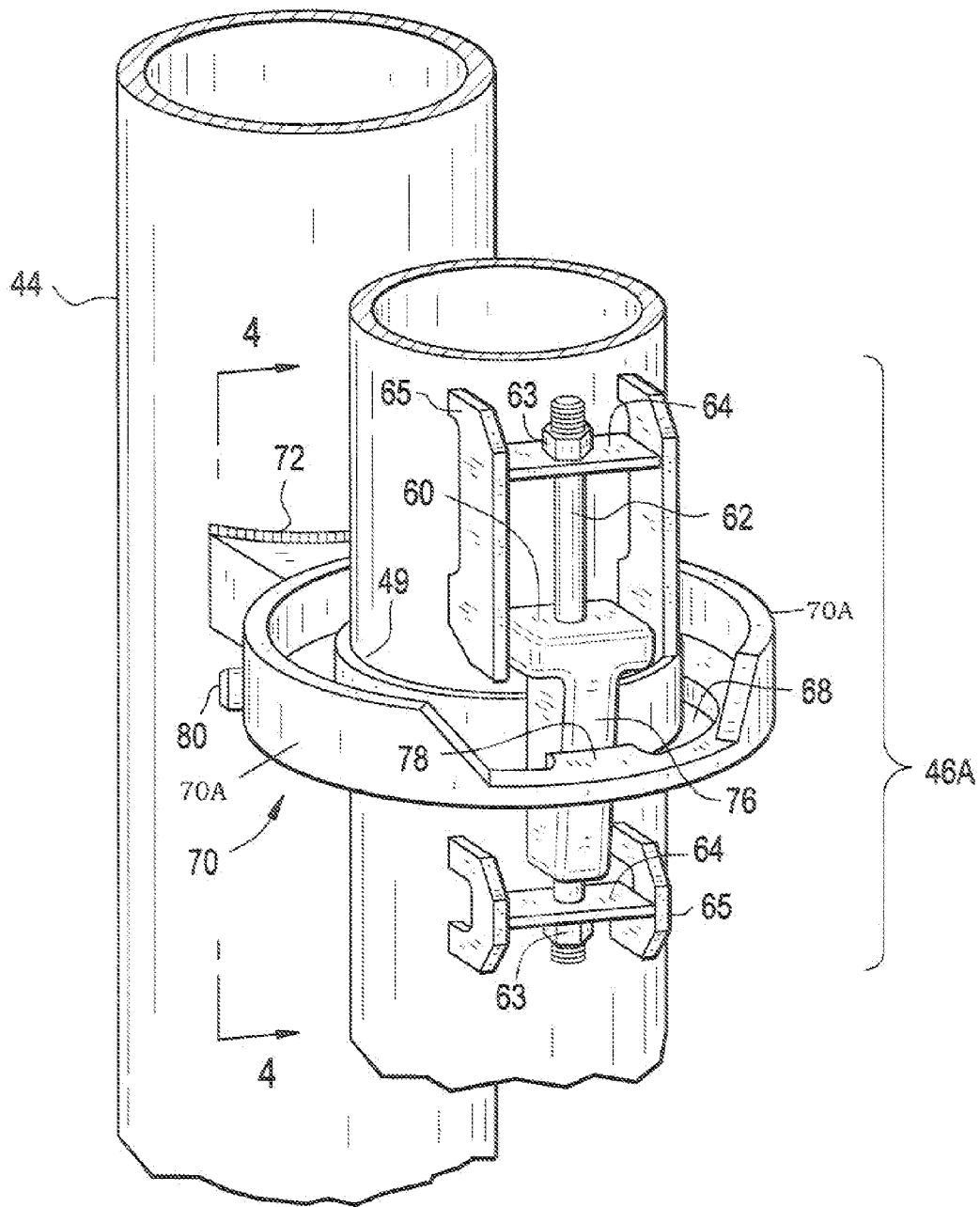
FIG. 3 is a partial perspective elevation view of a jet pump assembly horizontally supported by a conventional jet pump restrainer assembly including a bracket, the view taken along Line 3-3 of FIG. 2.

As shown in FIG. 3, jet pump restrainer assembly 46A includes bracket 70 (with horizontal edge 78 in between vertical side-wall 70A), wedge 60, adjustment screws 80, horizontal plates 64, vertical plates 65, and welds 72, described in detail, herein. Wedge 60 is movably mounted on a vertically extending guide rod 62 fastened to jet pump assembly 46. Guide rod 62 may have threaded ends engaged with nuts 63 fastened to horizontal plates 64 extending between vertical plates 65 that extend from the mixing section 52 of the jet pump assembly 46. The wedge 60 is designed to slide vertically through a hole 68 in a bracket 70, which is attached to the riser piping 44 by welds 72 or other suitable means. As shown by FIG. 3, the upper end of the guide rod 62 is above the bracket 70 and the lower end of the guide rod 62 is below the bracket 70. Also, the wedge 60 may move downwardly on the guide rod 62 under the force of gravity to a location where an inner surface of the wedge 60 contacts the jet pump assembly 46 (and preferably the boss 49) and an outer surface 76 of the wedge 60 that is inclined contacts an edge 78 of the bracket 70. The weight of the wedge 60 provides a sufficient force urging the jet pump assembly 46 against two (or more) adjustment screws 80 for horizontally supporting the jet pump assembly 46 against hydraulic forces and vibrations. The adjustment screws 80 may be fixed in place by welds (not shown). Preferably, the outer surface 76 of the wedge 60 is inclined relative to the edge surface 78 of the bracket 70. Advantageously, this three point suspension system can accommodate substantial thermal expansion differences.

Figure 4:
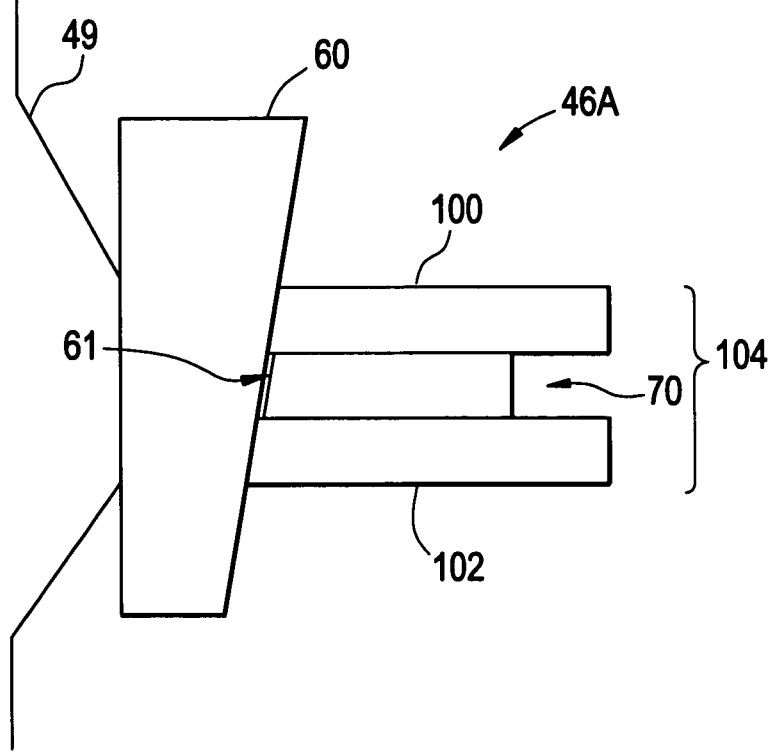
FIG. 4 is a simplified rendition of an example embodiment showing a side view of a jet pump restrainer assembly repair including bearing plates interfacing with a conventional bracket and mixer wedge, the view taken along Line 4-4 of FIG. 3.

FIG. 4 is a simplified rendition of a jet pump restrainer assembly 46A including a wedge 60 located between the boss 49 of mixing section 52 and bracket 70. Area 61 represents a damaged area between the contact surfaces of the wedge 60 and the bracket 70. Damage may occur on the contact surfaces of either the wedge 60, or the bracket 70, or both, due to thermal expansion, fretting, or wear between the wedge 60 and bracket 70, generally. Jet pump restrainer assembly repair 104 may include a top bearing plate 100, or a bottom bearing plate 102, or both, attached to bracket 70. The plates 100/102 may be fashioned above and/or below bracket 70, preferably on a horizontal surface of the bracket 70, such that plates 100/102 may increase the effective contact area between bracket 70 and wedge 60. This may be accomplished by using bearing plates 100/102 with a same angle of inclination as the existing wedge 60 and bracket 70, and aligning the contact surface between wedge 60 and plates 100/102 and the contact surface between wedge 60 and bracket 70, such that wedge 60 contacts both the plates 100/102 and bracket 70. While a benefit of the embodiment is that it allows a jet pump restrainer assembly 46A to be repaired in situ, without the disassembly or machining of jet pump restrainer assembly 46A, this embodiment may still allow for the disassembly and/or machining of the wedge and/or bracket during the repair. Specifically, the wedge 60 and/or bracket 70 may be machined in place, or jet pump restrainer assembly 46A may be disassembled allowing the machining and/or replacement of either the wedge 60 or the bracket 70 in addition to the fashioning of plates 100/102 on bracket 70. Additionally, example embodiments may be used as a preventative measure prior to actual wear between wedge 60 and bracket 70.

Figure 5:
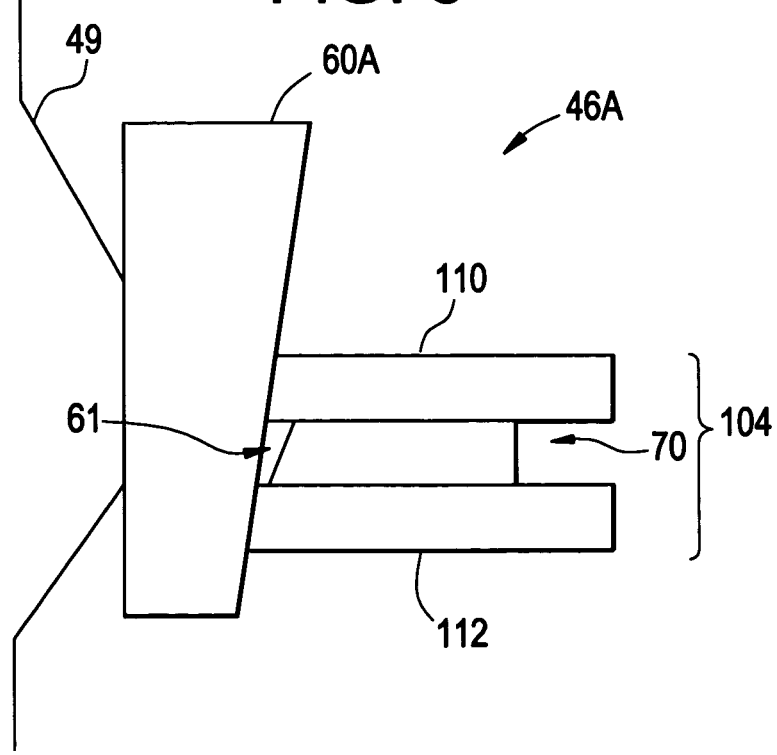
FIG. 5 is a simplified rendition of another example embodiment showing a side view of a jet pump restrainer assembly repair including bearing plates interfacing with a conventional bracket and mixer wedge, the view taken along Line 4-4 of FIG. 3.

FIG. 5 is another example embodiment, similar to FIG. 4. However, FIG. 5 depicts a replacement wedge 60A with a different angle of inclination than the wedge 60 originally in use. Replacement wedge 60A allows an upper bearing plate 110 and/or a lower bearing plate 112, also with a different angle of inclination matching replacement wedge 60A, to be shifted toward wedge 60A such that bracket 70 does not contact replacement wedge 60A (notice area 61 to indicate the difference in the angle of inclination between bracket 70 and wedge 60A, shown as a smaller angle of inclination for exemplary purposes). In an alternative embodiment, the existing wedge 60 (shown in FIG. 4) may be partially withdrawn from bracket 70 in order to allow room for bearing plates 110/112 to be shifted toward the location of wedge 60, thereby allowing only the bearing plates 110/112 and not bracket 70 to contact the wedge. In this alternative embodiment, the contact surface of bearing plates 110/112 may provide for a same angle of inclination as bracket 70 and wedge 60, ensuring that contact surfaces between plates 110/112 and wedge 60 match. Alternatively, a wedge with a larger angle of inclination may also be used. Whether the existing wedge 60 or a new wedge 60A is to be used, plates 110/112 should be provided with a contact surface angled to allow plates 110/112 to flushly contact the wedge, ideally allowing both plates 110/112 to flushly mate with the wedge, although example embodiments may allow for just one of plates 110/112 to flushly mate with the wedge.

Figure 6:
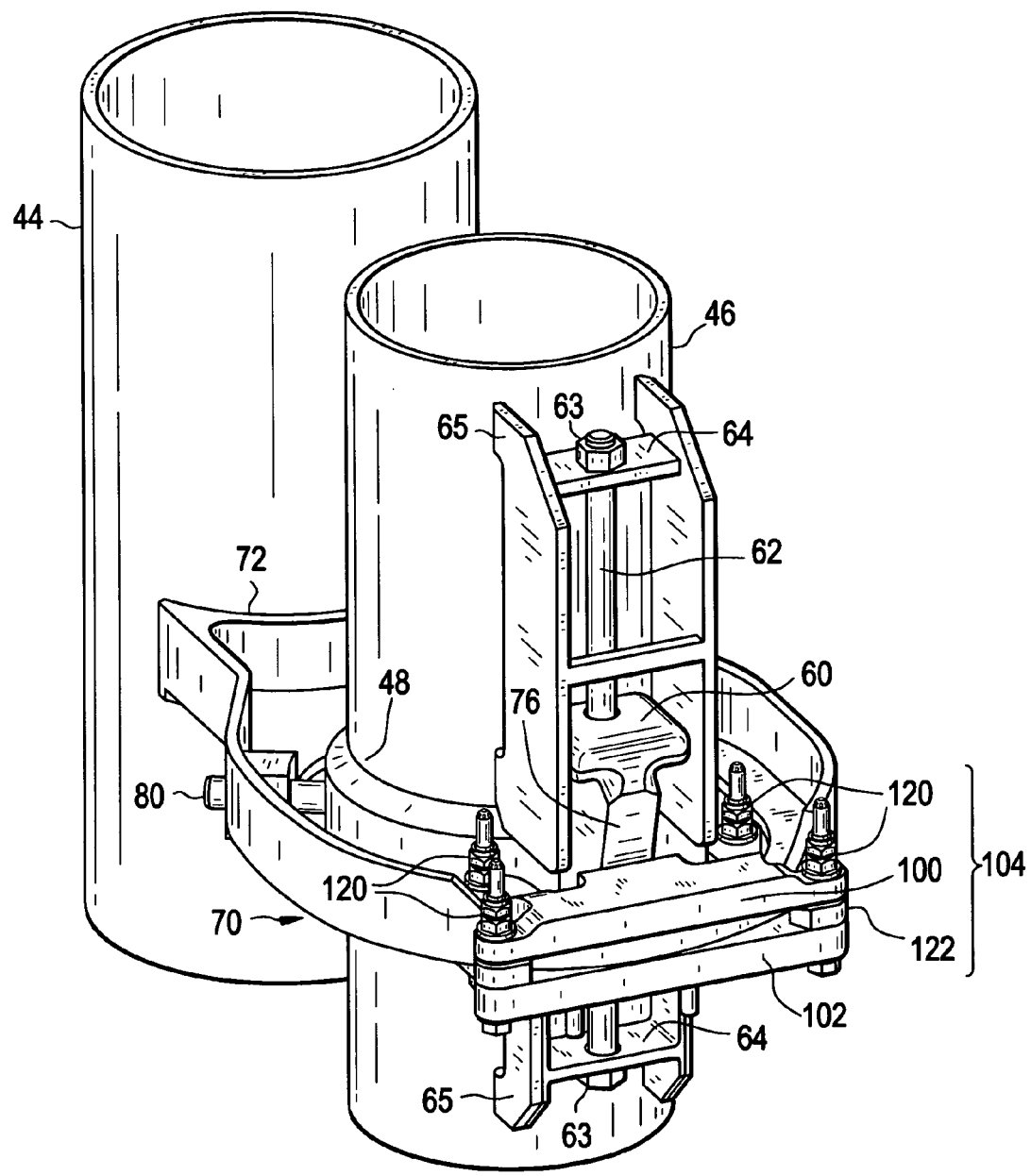
FIG. 6 is a perspective view of an example embodiment showing a jet pump restrainer assembly repair interfacing with a conventional bracket and mixing wedge, the view from a slight overhead angle.

FIG. 6 is a perspective view, similar to FIG. 3, with the restrainer assembly repair 104 shown interfacing with wedge 60 and bracket 70. Top bearing plate 100 and bottom bearing plate 102 may be held together by mounting bolts 120. The positioning of the mounting bolts 120 may be in any location that ensures that bearing plates 100/102 are securely affixed to bracket 70, to provide plates 100/102 with stable support to place a horizontal force on the outer surface 76 of wedge 60. Additionally, adjusting bolt collars 122, such as an eccentric cam, may be used in conjunction with mounting bolts 120 to allow for the fine positioning of plates 100/102 relative to bracket 70.

Figure 7:
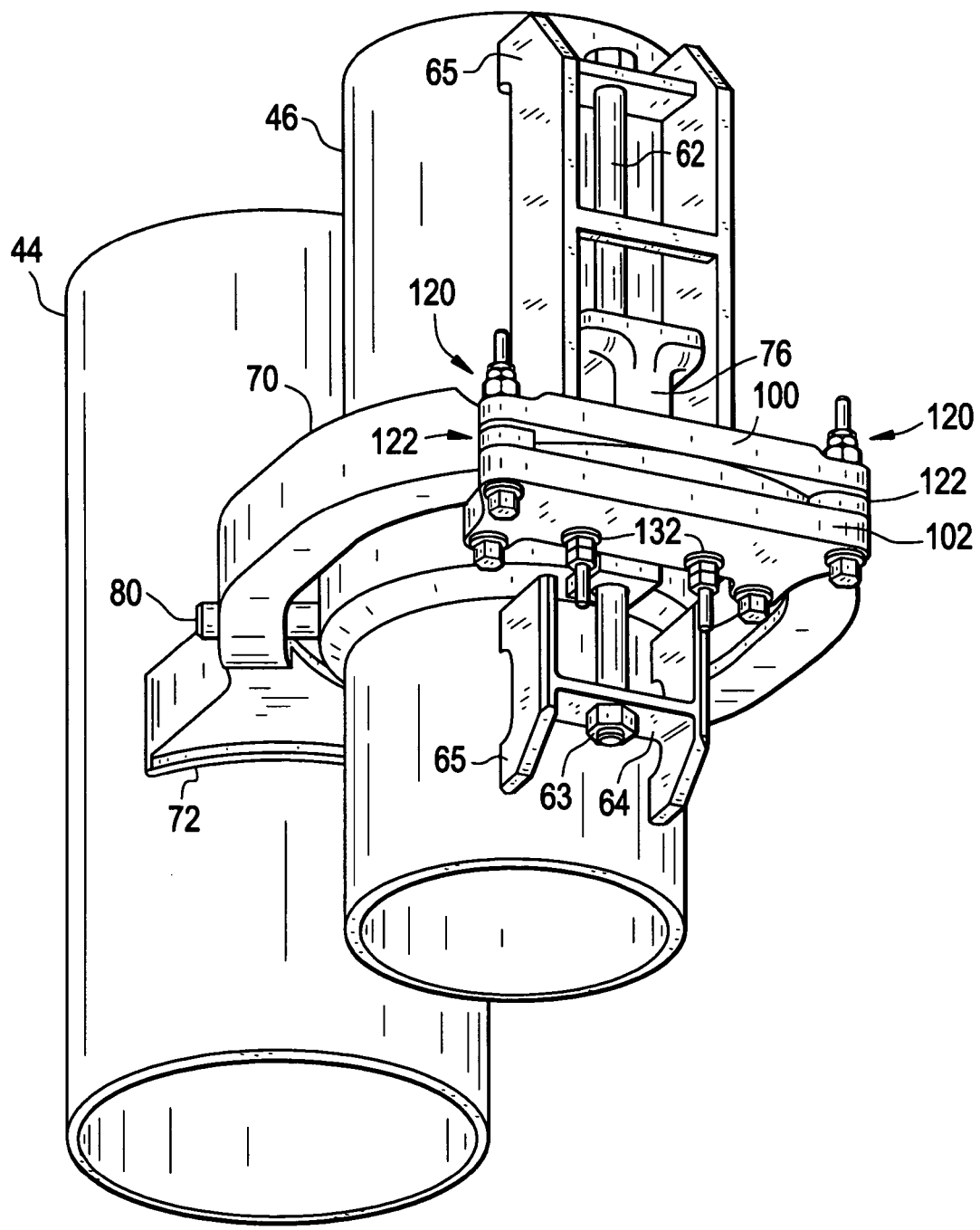
FIG. 7 is a perspective view of an example embodiment showing a jet pump restrainer assembly repair interfacing with a conventional bracket and mixing wedge, the view from a slight underneath angle.

FIG. 7 is a perspective view of FIG. 6, from a slightly underneath angle. Locating bosses 130 (shown in FIGS. 8 and 9) may be provided to ensure the proper placement of plates 100/102 relative to brackets 70. The locating bosses 130 (shown in FIGS. 8 and 9) may include locating boss bolts 132 used to stabilize the bosses 130. Alternatively, plates 100/102 may be machined to allow for locating bosses 130 to be an integral part of the plates themselves.

Figure 8:
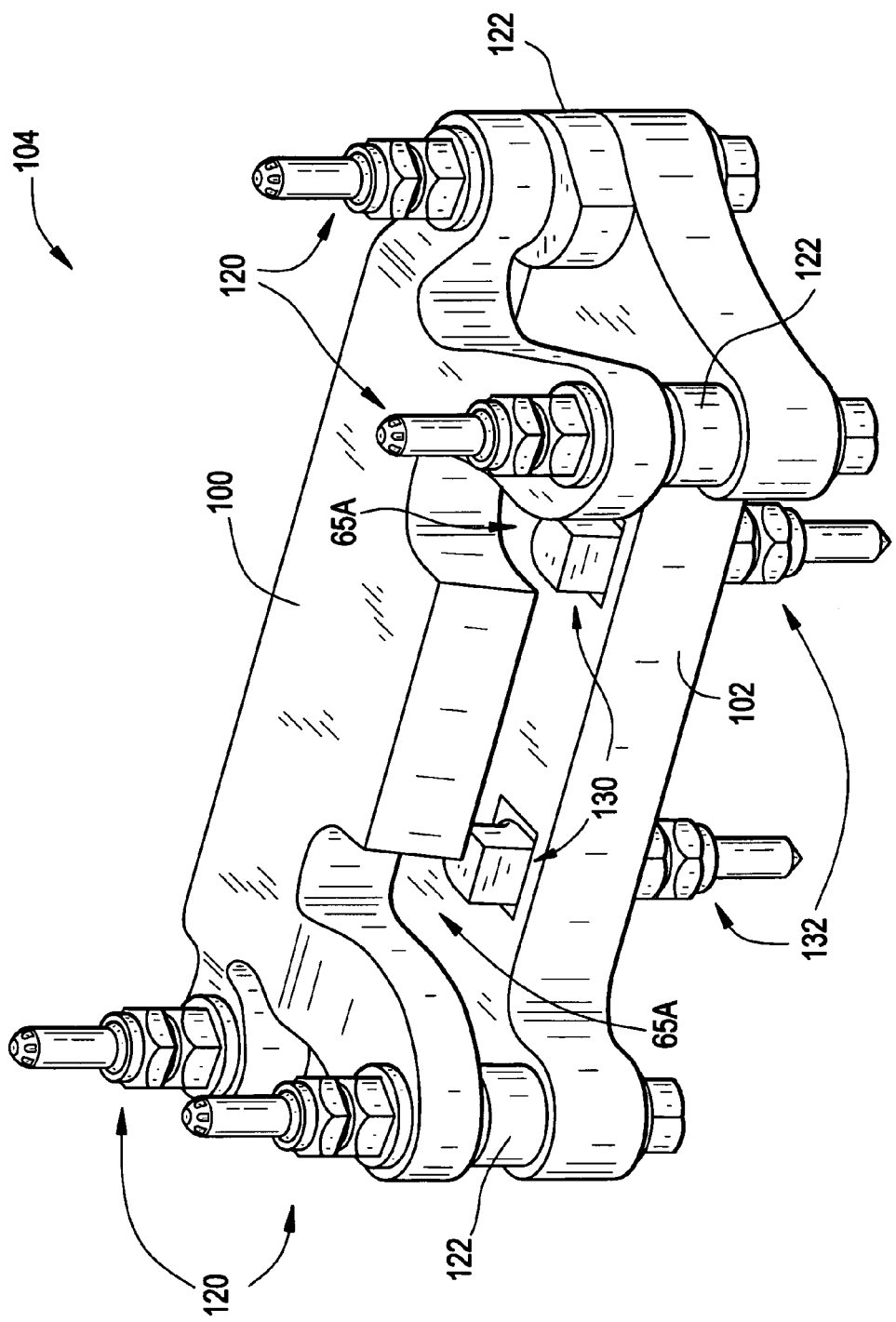
FIG. 8 is a detailed depiction of an example embodiment of a jet pump restrainer assembly repair showing top and bottom bearing plates, mounting bolts, optional locating bosses, and optional adjusting bolt collars.

FIG. 8 is a detailed drawing showing an example embodiment of a restrainer assembly repair 104 including a top bearing plate 100 and a bottom bearing plate 102, the bearing plates 100/102 held together and able to be secured to bracket 70 by mounting bolts 120. Optional bolt collars 122, such as an eccentric cam, may be used for fine positioning of the restrainer assembly repair 104 relative to bracket 70 and wedge 60. Cut-out areas 65A may be included on the top bearing plate 100, to allow the top plate 100 to fit down over vertical plates 65 (vertical plates 65 are shown in at least FIGS. 6 and 7). Optional locating bosses 130 may be included to allow the restrainer assembly repair 104 to be more easily positioned relative to the bracket 70. Locating boss bolts 132 are used to secure the locating bosses 130 once they are positioned, allowing the restrainer assembly repair 104 to apply a horizontal force to wedge 60. Alternatively, plates 100 or 102 may be machined such that locating bosses 130 are an integral part of the plates themselves.

While example embodiments shows two bearing plates (one to be positioned above bracket 70, and the other to be positioned below bracket 70), four mounting bolts 120 (two to be located on either side of a bracket 70), four adjusting bolt collars 122 (designed to contact bracket 70 on the inner and outer surface of the bracket), and two sets of locating bosses 130 and locating boss bolts 132 (designed to contact bracket 70 on the inner surface of the bracket), it should be understood that example embodiments are not limited to this specific design. Specifically, restrainer assembly repair 104 may be provided with just one bearing plate (to be positioned either above or below bracket 70), a greater or lesser number of mounting bolts 120 to be located in any position that securely attaches bearing plates 100/102 to bracket 70, the optional adjusting bolt collars 122 may be provided to interface with either the inner and/or outer surface of bracket 70 (any number of bolt collars 122 may be used; alternatively, no bolt collars 122 may be used), and the optional locating bosses 130 may be provided to interface with either the inner or outer surface of bracket 70 (any number of locating bosses 130 may be used; alternatively, no locating bosses 130 may be used).

Additionally, while example embodiment use mounting bolts 120 to hold plates 100/102 together and affix the restrainer bracket repair 104 to bracket 70, any means may be used to fulfill this purpose. Specifically, clamps, welds, screws, nails, adhesive, or other means may be used to attach plates 100/102 to bracket 70. While plates 100/102 are referred to as plural (specifically, two plates) throughout this document, it should be understood that, alternatively, only one bearing plate may be used instead. Furthermore, while example embodiments show mounting bolts 120 that preferably do not penetrate bracket 70, it should be understood that mounting bolts, clamps, screws, nails, or other attachment means may alternatively penetrate bracket 70 as a way of attaching plates 100/102 to bracket 70.

Figure 9:
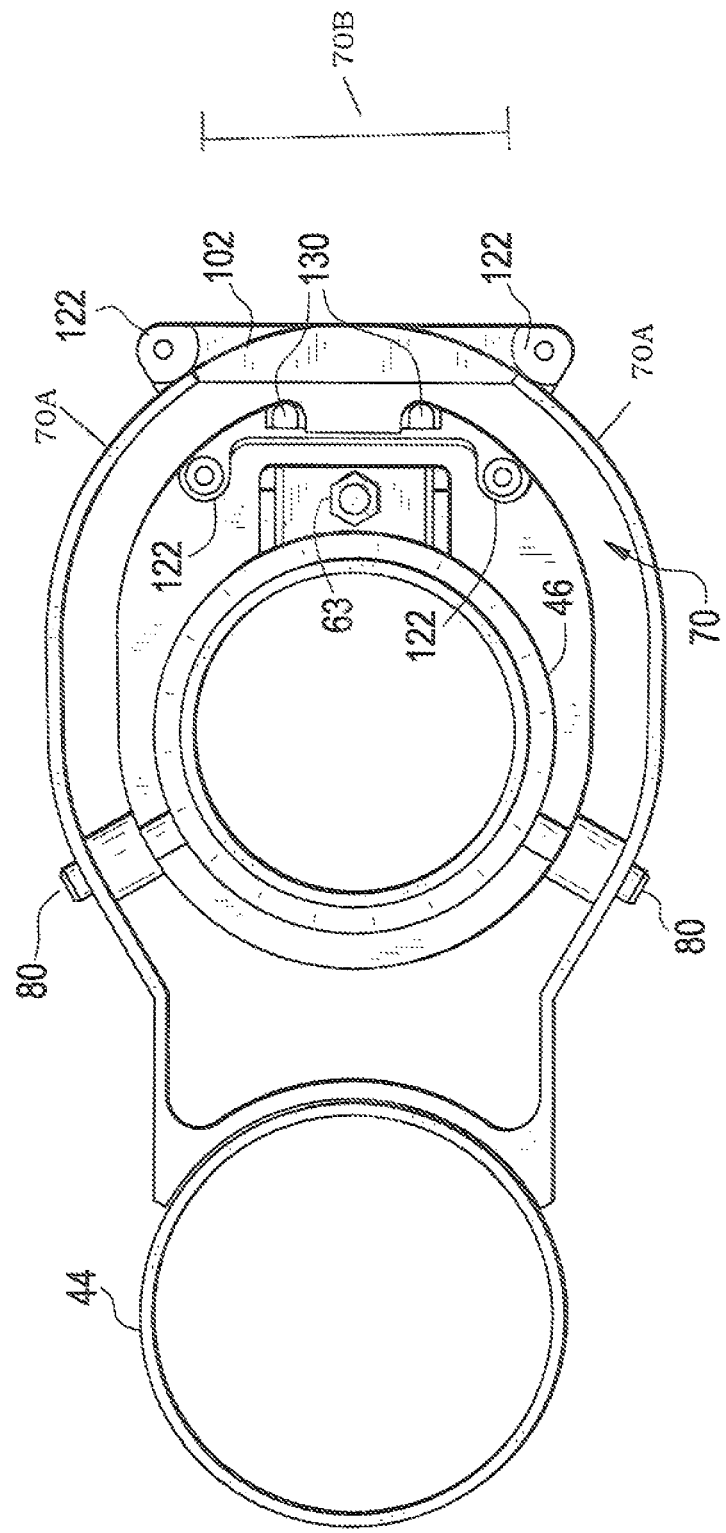
FIG. 9 is an overhead view of an example embodiment of a jet pump restrainer assembly repair, shown without a top bearing plate in order to show optional locating bosses and optional adjusting bolt collars.

FIG. 9 is an overhead view of FIGS. 6 and 7, shown without top bearing plate 100. Notice bolt collars 122 contacting the inner and outer surfaces of bracket 70, while locating bosses 130 are contacting the inner surface of bracket 70. Also notice that a main body of the lower bearing plate 102 spans across an entire length of a flexible area (70B, signifying the gap between vertical side-walls 70A) of the restrainer bracket.

Figure 10:
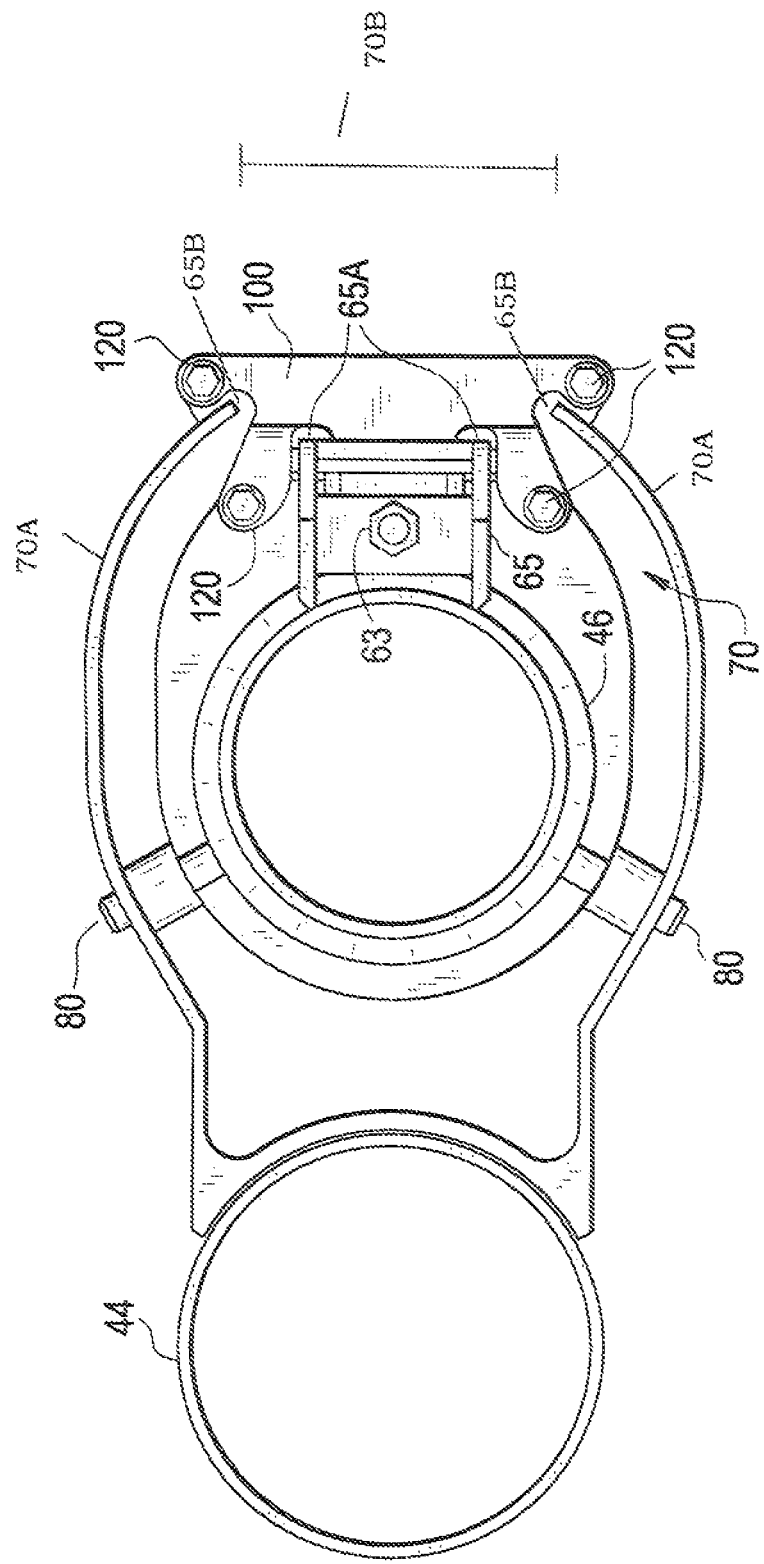
FIG. 10 is the overhead view of the example embodiment of FIG. 9, shown with a top bearing plate.

FIG. 10 is the same view as shown in FIG. 9, but with the addition of top bearing plate 100. Notice cut-out area 65A which allows top bearing plate 100 to slide over vertical plates 65. Also notice additional cut-out areas 55B of top bearing plate 100 which allow vertical side-walls 70A of the restrainer bracket 70 to fit within the additional cut-out areas 65B. The additional cut-out areas 65B allow a main body of the top bearing plate 100 to span across an entire length of the flexible area (70B) of the restrainer bracket 70.

Figure 11:
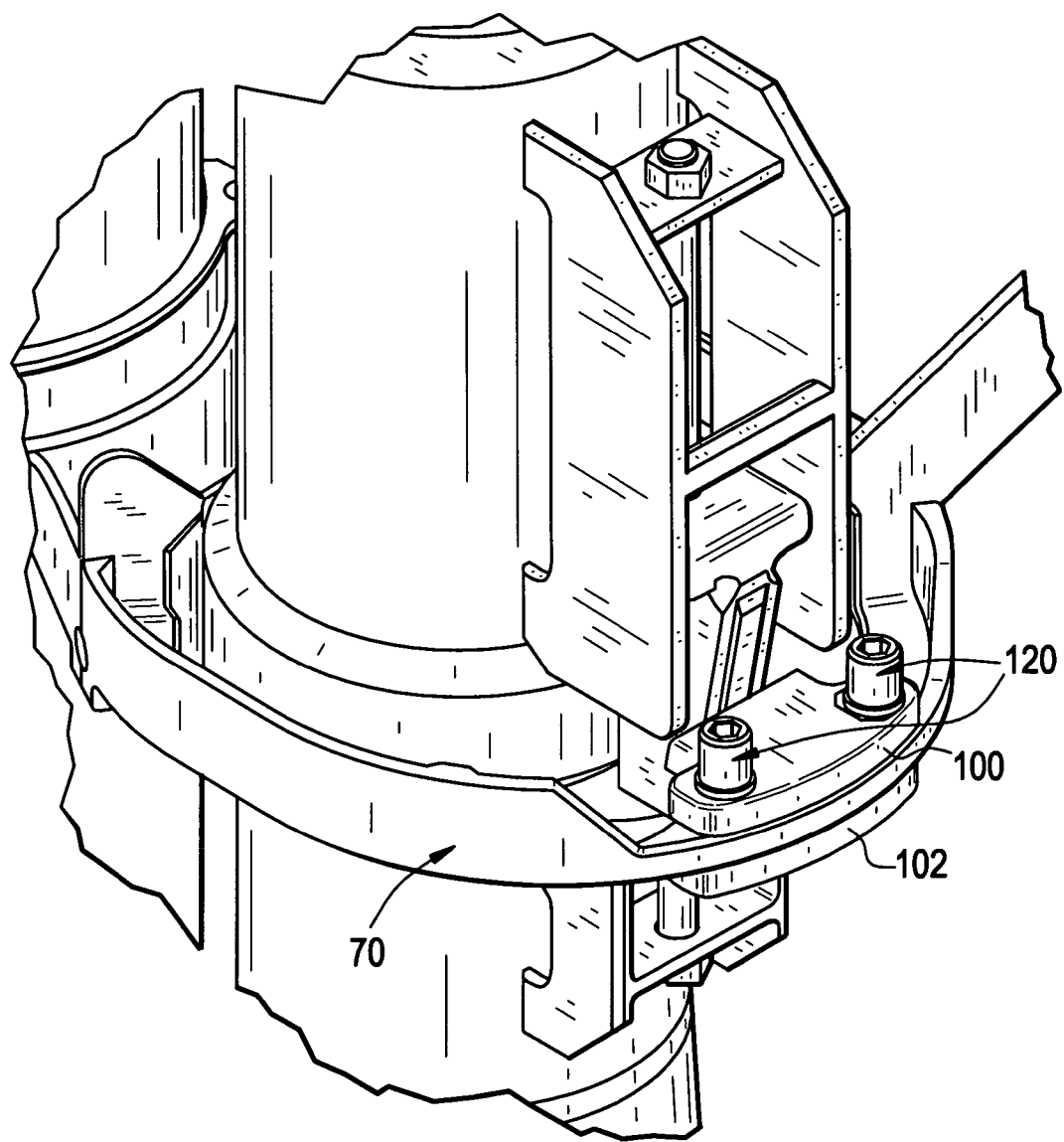
FIG. 11 is a perspective view of an example embodiment showing mounting bolts penetrating the bracket.
Figure 12:
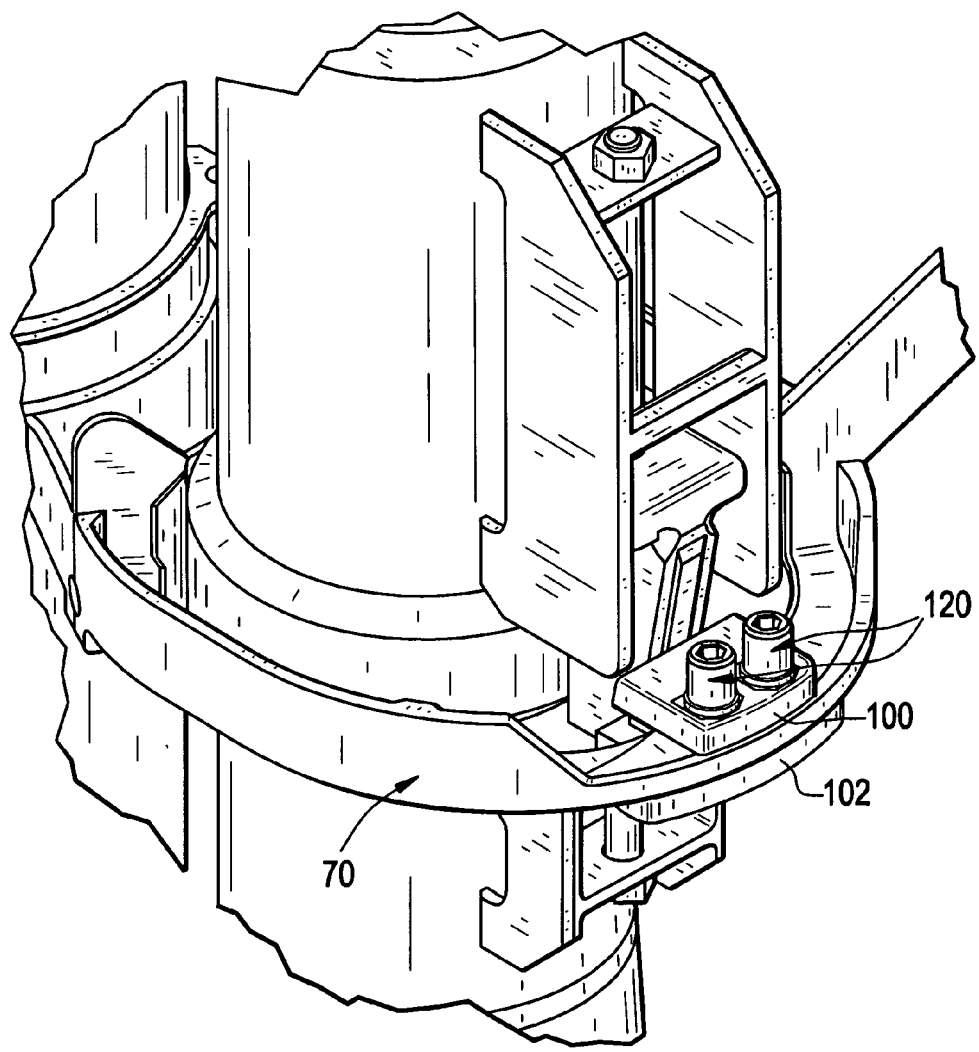
FIG. 12 is a perspective view of an example embodiment showing mounting bolts penetrating the bracket, with a tighter bolt pattern than the one shown in FIG. 11.

FIG. 11 is an example embodiment showing mounting bolts 120 penetrating bracket 70.

FIG. 11 is an example embodiment showing mounting bolts 120 penetrating bracket 70 using a tighter bolt pattern than FIG. 11.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A jet pump restrainer assembly repair apparatus comprising:
a bearing plate attached to a horizontal surface of a horizontally extending jet pump restrainer assembly bracket, the bearing plate including a contact surface configured to flushly contact a front, vertically extending contact surface of a mixer wedge, wherein a main body of the bearing plate spans across a gap between vertical side-walls of the jet pump restrainer assembly bracket.

2. The jet pump restrainer assembly repair apparatus of claim 1, further comprising:
a locating boss vertically extending from the bearing plate and contacting an inner surface of the horizontally extending jet pump restrainer bracket to ensure that the jet pump restrainer assembly repair is properly aligned with the jet pump restrainer assembly bracket.

3. The jet pump restrainer assembly repair of apparatus claim 1, further comprising:
an adjusting bolt collar attached to the jet pump restrainer assembly repair, the adjusting bolt collar being an eccentric, rotatable cam configured to contact an inner or an outer surface of the jet pump restrainer bracket to allow fine positioning of the jet pump restrainer assembly repair relative to the jet pump restrainer assembly bracket.

4. The jet pump restrainer assembly repair apparatus of claim 1, the contact surface of the bearing plate having an angle of inclination matching an angle of inclination of the front, vertically extending contact surface of the mixer wedge and a contact surface of the jet pump restrainer assembly bracket.

5. The jet pump restrainer assembly repair apparatus of claim 4, wherein the contact surface of the bearing plate, the contact surface of the jet pump restrainer assembly bracket, and the front, vertically extending contact surface of the mixer wedge are coplanar, allowing the mixer wedge to contact both the bearing plate and the jet pump restrainer assembly bracket.

6. The jet pump restrainer assembly repair apparatus of claim 1, wherein the contact surface of the bearing plate has an angle of inclination that is the same as an angle of inclination of the front, vertically extending contact surface of the mixer wedge, but different than an angle of inclination of a contact surface of the jet pump restrainer assembly bracket.

7. The jet pump restrainer assembly repair apparatus of claim 6, wherein the contact surface of the bearing plate horizontally extends beyond the contact surface of the jet pump restrainer assembly bracket, allowing only the bearing plate and not the jet pump restrainer assembly bracket to contact the front, vertically extending contact surface of the mixer wedge.

8. A jet pump restrainer assembly repair apparatus comprising:
a top bearing plate attached to an upper horizontal surface of a jet pump restrainer assembly bracket;
a bottom bearing plate attached to a lower horizontal surface of the jet pump restrainer assembly bracket, the top and bottom bearing plates having contact surfaces angled to mate flushly with a mixer wedge; and
a plurality of mounting bolts holding the top and bottom bearing plates together and securing the top and bottom bearing plates to the jet pump restrainer assembly bracket.

9. The jet pump restrainer assembly repair apparatus of claim 8, further comprising:
a locating boss on the top or bottom bearing plate, the locating boss positioned on the top or bottom bearing plate to ensure that the jet pump restrainer assembly repair is properly aligned with the jet pump restrainer assembly bracket; and
a locating boss bolt securing the locating boss on the top or bottom bearing plate.

10. The jet pump restrainer assembly repair apparatus of claim 9, wherein the locating boss is attached to the bottom bearing plate, the locating boss positioned to contact an inner surface of the jet pump restrainer assembly bracket.

11. The jet pump restrainer assembly repair apparatus of claim 8, further comprising:
an adjusting bolt collar attached to the jet pump restrainer assembly repair to allow fine positioning of the jet pump restrainer assembly repair relative to the jet pump restrainer assembly bracket.

12. The jet pump restrainer assembly repair apparatus of claim 11, wherein the adjusting bolt collar is an eccentric cam located between the top and bottom bearing plates, the eccentric cam contacting a surface of the jet pump restrainer assembly bracket and held in place by one of the plurality of mounting bolts.

13. The jet pump restrainer assembly repair apparatus of claim 8, further comprising:
cut-out areas on the top bearing plate, the cut-out areas configured to allow the top bearing plate to slide over vertical plates of the jet pump restrainer assembly.

14. The jet pump restrainer assembly repair apparatus of claim 8, wherein the contact surfaces have an angle of inclination matching an angle of inclination of a contact surface between the mixer wedge and the jet pump restrainer assembly bracket.

15. The jet pump restrainer assembly repair apparatus of claim 14, wherein the top and bottom bearing plates are attached to the jet pump restrainer assembly bracket such that the contact surfaces between the mixer wedge and the top and bottom bearing plates and the contact surface between the mixer wedge and the jet pump restrainer assembly bracket align, allowing the mixer wedge to contact the top and bottom bearing plates and the jet pump restrainer assembly bracket.

16. The jet pump restrainer assembly repair apparatus of claim 8, wherein the contact surfaces have an angle of inclination that is different than an angle of inclination of a contact surface between the mixer wedge and the jet pump restrainer assembly bracket.

17. The jet pump restrainer assembly repair apparatus of claim 16, wherein the top and bottom bearing plates are attached to the jet pump restrainer assembly bracket such that the top and bottom bearing plates are positioned more toward the mixer wedge compared to the position of the jet pump restrainer assembly bracket, allowing only the top and bottom bearing plates and not the jet pump restrainer assembly bracket to contact the mixer wedge.

18. A method of jet pump restrainer assembly repair comprising:
attaching a bearing plate to a horizontal surface of a horizontally extending jet pump restrainer assembly bracket, the bearing plate including a contact surface configured to flushly contact a front, vertically extending contact surface of a mixer wedge, wherein a main body of the bearing plate spans across a gap between vertical side-walls of the jet pump restrainer bracket.

19. The method of jet pump restrainer assembly repair of claim 18, further comprising:
aligning a locating boss to contact an inner surface of the horizontally extending jet pump restrainer assembly bracket allowing the jet pump restrainer assembly repair to be properly positioned on the jet pump restrainer assembly bracket, the locating boss vertically extending from the bearing plate.

20. The method of jet pump restrainer assembly repair of claim 18, further comprising:
contacting an adjusting bolt collar with an inner or outer surface of the jet pump restrainer bracket to establish fine positioning of the jet pump restrainer assembly repair relative to the jet pump restrainer assembly bracket, the adjusting bolt collar being an eccentric, rotatable cam attached to the jet pump restrainer assembly repair.

21. The method of jet pump restrainer assembly repair of claim 18, further comprising:
matching an angle of inclination of the contact surface of the bearing plate with an angle of inclination of the front, vertically extending contact surface of the mixer wedge and a contact surface of the jet pump restrainer assembly bracket.

22. The method of jet pump restrainer assembly repair of claim 21, further comprising:
aligning the contact surface of the bearing plate, the contact surface of the jet pump restrainer assembly bracket, and the front, vertically extending contact surface of the mixer wedge so that the contact surfaces are coplanar, allowing the mixer wedge to contact both the bearing plate and the jet pump restrainer assembly bracket.

23. The method of jet pump restrainer assembly repair of claim 18, further comprising:
forming an angle of inclination of the contact surface of the bearing plate that is the same as an angle of inclination of the front, vertically extending contact surface of the mixer wedge, but different than an angle of inclination of a contact surface between of the jet pump restrainer assembly bracket.

24. The method of jet pump restrainer assembly repair of claim 18, further comprising:
shifting the location of the bearing plate on the jet pump restrainer assembly bracket toward the mixer wedge, allowing only the bearing plate and not the jet pump restrainer assembly bracket to contact the front, vertically extending contact surface of the mixer wedge.

25. The jet pump restrainer assembly repair apparatus of claim 1, wherein the main body of the bearing plate spans across an entire length of the gap between vertical side-walls of the jet pump restrainer assembly bracket.

26. The jet pump restrainer assembly repair apparatus of claim 8, wherein the top bearing plate defines additional cut-out areas on ends of the top bearing plate allowing vertical side-walls of the jet pump restrainer assembly bracket to fit within the additional cut-out areas, a main body of the top and bottom bearing plates both spanning across an entire length of a flexible area of the jet pump restrainer assembly bracket, the flexible area being a gap between vertical side-walls of the jet pump restrainer assembly bracket.

* * * * *